US007657762B2

(12) United States Patent
Orr

(10) Patent No.: US 7,657,762 B2
(45) Date of Patent: Feb. 2, 2010

(54) APPARATUS AND METHODS FOR POWER MANAGEMENT OF A CIRCUIT MODULE

(75) Inventor: Stephen J. Orr, Markham (CA)

(73) Assignee: ATI Technologies, Inc., Markham, Ontario (CA)

( * ) Notice: Subject to any disclaimer, the term of this patent is extended or adjusted under 35 U.S.C. 154(b) by 763 days.

(21) Appl. No.: 11/036,254

(22) Filed: Jan. 14, 2005

(65) Prior Publication Data
US 2006/0161793 A1 Jul. 20, 2006

(51) Int. Cl.
*G06F 1/26* (2006.01)
(52) U.S. Cl. ...................................... 713/300
(58) Field of Classification Search .................. 713/300
See application file for complete search history.

(56) References Cited

U.S. PATENT DOCUMENTS

| 5,560,022 | A | * | 9/1996 | Dunstan et al. | ............. | 713/300 |
| 5,881,300 | A | * | 3/1999 | Chen | .......................... | 713/340 |
| 6,480,964 | B1 | * | 11/2002 | Oh | ............................. | 713/310 |
| 6,738,834 | B1 | * | 5/2004 | Williams et al. | ............... | 710/8 |
| 2004/0128569 | A1 | | 7/2004 | Wyatt et al. | | |
| 2004/0225905 | A1 | | 11/2004 | Kawano et al. | | |

FOREIGN PATENT DOCUMENTS

EP 0749063 A2 12/1996

OTHER PUBLICATIONS

Bradley, Justin; "Re: Another 3.1 feed"; Internet document; Newsgroup message; May 23, 2003; lines 44-56.
ZAURUS@KILLEFIZ.DE; "sharp rom"; Internet document; Dec. 28, 2002.
"Sharp Zaurus SL5500 with a CF Wifi card"; Computer System; Dec. 28, 2002; The Sharp Zaurus SL5500 comprises a hot-(un)pluggable CF slot and a software eject button usable for power down an introduced WIFI card.
International Search Report from European Patent Office dated Sep. 18, 2006, for International Application No. PCT/IB2006/000173, pp. 1-12.

* cited by examiner

*Primary Examiner*—Thomas Lee
*Assistant Examiner*—Eric Chang
(74) *Attorney, Agent, or Firm*—Vedder Price, P.C.

(57) ABSTRACT

The present disclosure relates to methods and apparatus for controlling power consumption of a plug-in card or circuit module. The disclosed method, in particular, controls power to a circuit module and includes implementing a user interface and power manager to automatically control the power state of the circuit module by, among other things, powering the module up or down using a simulated hot unplug of the device. The apparatus further includes use of an I/O interconnect to allow the system BIOS to simulate the hot unplugging of the module.

27 Claims, 6 Drawing Sheets

APPARATUS AND METHODS FOR POWER MANAGEMENT OF A CIRCUIT MODULE

FIELD OF THE INVENTION

The present disclosure relates to apparatus and methods for management of power for circuit modules and, more particularly to a power management system and methods for plug-in type modules for a computer system.

BACKGROUND OF THE INVENTION

In computer systems, additional functionalities may be added to such systems through the use of add-on hardware, such as plug-in modules or circuit boards. Such boards include, for example, wireless network cards, graphics processing cards, and television video decoder and tuner cards. Typically, when the computer system is operating, these cards draw power, even when they are not in use. For systems where the source of power is limited, such as laptop computers or mobile computing devices using a battery, power consumption due to idle plug-in hardware wastes valuable, limited energy resources.

In order to economize energy resources, it is known to physically unplug the plug-in cards to save power. Alternatively, it is also known to manually turn off plug-in cards or modules when not in use through a device manager, which is typically software, particularly in devices where such plug-in cards or modules are not easily accessible, such as in a laptop computer or mobile computing device, however, such device managers may not actually effect a total powering down of the card or module, thus still consuming power. Moreover, a manual on/off scheme relies upon a user to control power usage of the external hardware, which does not always provide accurate or current energy management. Additionally, in cases where an application may be requesting a currently powered down circuit module, a user must manually power up the plug-in module in order to enable the application to properly access the plug-in hardware.

DETAILED DESCRIPTION OF THE PRESENT EMBODIMENTS

The present disclosure relates to methods and apparatus for controlling power consumption of a circuit module. The disclosed method, in particular, controls power to a circuit module and includes implementing a power manager to control the power state of the circuit module according to one or more power control processes. The circuit module is operable in accordance with at least one standard allowing for unplugging of the circuit module during an operational connection. The method also includes establishing a user interface that communicates with a power manager to enable the receipt of one or more user data, the user data used to establish settings of the one or more power control processes. The method further includes implementing the device driver configured to operate the circuit module and establishing a program interface for communication between the power manager and the device driver. A communication link between the power manager and a system BIOS is also established. Finally, the method includes providing an I/O interface between the system BIOS and the circuit module in order to simulate using the system BIOS as least one of disconnection of the circuit module from the system BIOS and connection of the circuit module to the system BIOS.

Figure 1:
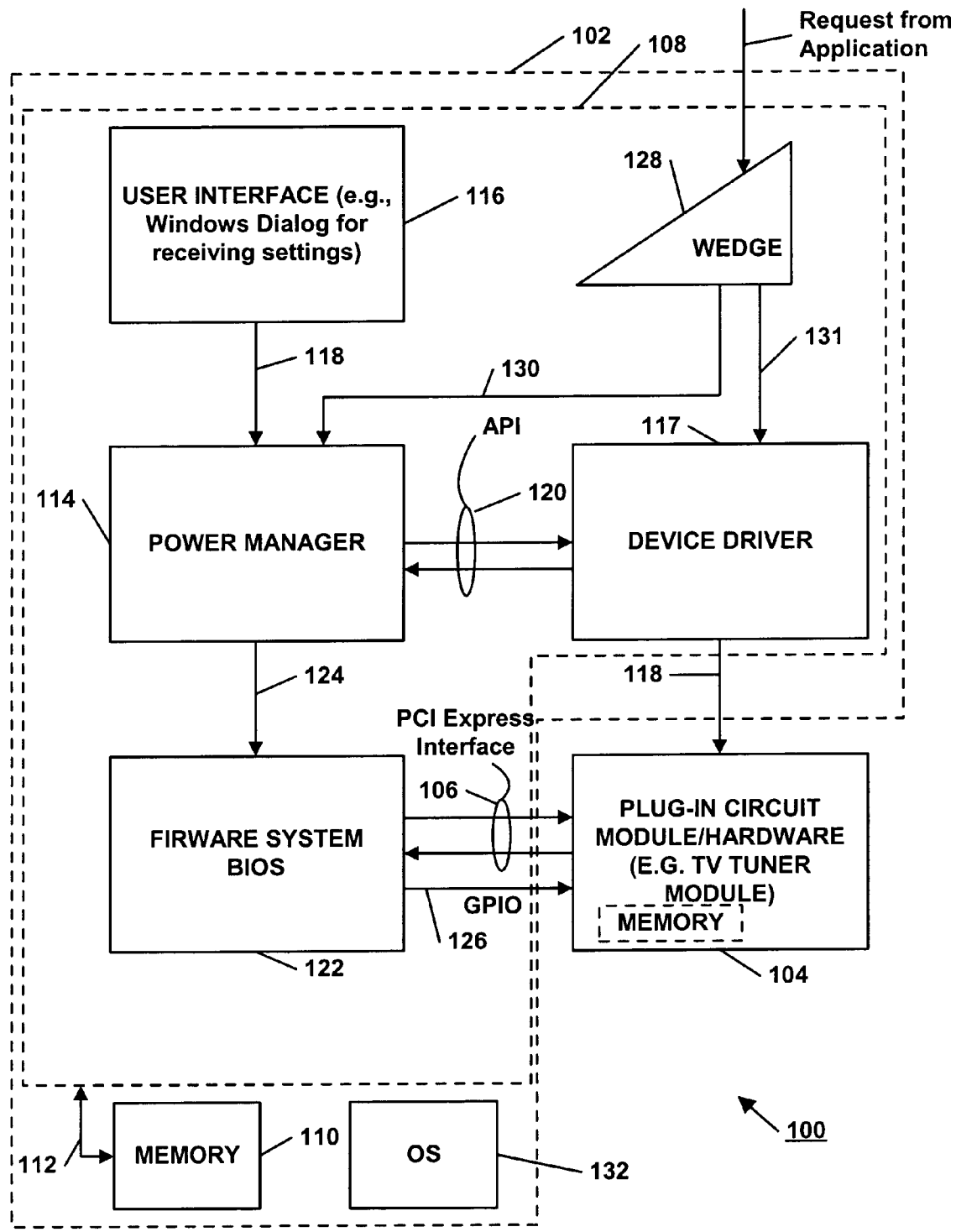
FIG. 1 illustrates an example of a power management system in accordance with the present disclosure.

The disclosed methods and apparatus are employable with a processing circuitry, such as a motherboard or any other similar device and a plug-in type module or a hardwired module including hardware or software performing an application specific function and one or more memories storing instructions executable by the processing circuitry. In one example, where the modules or cards are connected to a processing circuitry or "mother board" via an interconnect standard such as Peripheral Component Interconnect (PCI) Express, this standards allow modules or cards to be disconnected when in an operational connection, which is commonly referred to as "hot unplugging." Under such a standard providing hot unplugging, it is possible to simulate an unplug event using an input/output (I/O) interconnect from the motherboard to the plug-in module in order to power down the PCI connection. Additionally, a plug in event may also be simulated using the I/O interconnect to power up the PCI interface. The presently disclosed apparatus and methods utilize this capability to effect power management by shutting down the modules without actually unplugging them. Further, by implementing a power manager, which may comprise hardware, firmware or software, various power control processes may be effected to more accurately control power to the plug-in circuit module, thus providing efficient power management. FIG. 1 illustrates a system 100 that includes processing circuitry 102, such as a motherboard, as an example, employing a CPU and system memory, or an integrated CPU and memory device. It is noted that, for purposes of this disclosure, the designated processing circuitry 102 is not illustrated only as hardware, but as a combination of hardware, firmware and software components, software being run on the hardware and firmware components. System 100 also includes an external plug-in module/hardware 104, which connects to the circuitry 102 via an interface 106, such as the PCI Express interface. It is noted that the interface 106 may operate according to any number of various standards supporting hot unplugging including, but not limited to, PCI Express, Universal Serial Bus (USB), and IEEE 1394 FireWire.

The processing circuitry 102 also includes a processing portion 108 and a memory 110 communicating with the processing circuitry 108 via a memory interface 112. It is noted that the processing portion 108 and memory 110 may be separate, as illustrated, or alternatively could be integral. The processing portion 108 is configured to run a power manager 114, which is implemented as software, firmware or hardware. The power manager 114 is configured to control the power state of the circuit module 104 according to one or more power control processes effected by the power manager 114.

The system 100 also includes a user interface 116 that communicates with the power manager 114 via a communication connection 118. The user interface 116, which may be implemented as a Windows® tray application or with any other suitable graphical user interface, enables receipt of one or more user data used to establish settings for the power control processes effected by the power manager 114. The power control processes, which will be described in detail later, allow a user to select a number of power control settings used for powering up or powering down the circuit module 104 to control power consumption of the module 104. The processing portion 108 also includes a device driver 117 driving the plug-in circuit module 104 via an interconnect bus 118, which may be part of the PCI Express interface 106 or a separate connection.

Device driver 117 is also connected to the power manager 114 via an interface 120, such as an application program interface (API). The interface 120 communications information from the device driver 117 to the power manager 114, such as how long the plug-in circuit module 104 has been in use or how long the module 104 has been idle, if not in use. This power manager 114, in turn uses this information to effect various power control processes, such as powering down the plug-in circuit module 104 when idle for a prescribed period of time, as only one example.

The processing portion 108 also includes a system BIOS 122, which is typically implemented as firmware in a read only memory (ROM) device. A communication link 124 affords signaling from the power manager 114 to the system BIOS 122 in order to effect power control of the plug-in circuit module 104.

An I/O interface 126 between the system BIOS 122 and the plug-in circuit module 104, is provided for, among other things, simulating a hot unplugging event. In particular, the BIOS 122 sends a signal via the I/O interface 126 that causes the BIOS 122 to detect what appears to be an unplug of the plug-in circuit module 104 from the PCI Express interface 106. It is noted that the I/O interface 126 may be implemented as a general purpose I/O (GPIO) or any other suitable interface implementable between a processing circuit, such as a motherboard, and a plug-in hardware device. Additionally, it is noted that the I/O interface 126 may also be used to simulate a plug-in event at a time when the plug-in circuit module 104 has been powered down, in order to effect powering up of the module 104.

In situations where the device driver 117 has been unloaded, such as when a plug-in circuit module 104 has been powered down, an application (not shown) running on the processing circuitry 108 may call for the external hardware 104. In this situation, because the device driver 117 is unloaded, the application will cause an error to occur. In order to cure this situation, what is known as a software "wedge" 128 may be implemented to respond to requests from applications calling the hardware 104. That is, the wedge 128 acts as a driver "proxy" that will initiate loading of the real device driver 117. In other words, the wedge 128 pretends to be the device driver 117 and effects calling the real device driver 117 by proxy over a public API connection 130 between the wedge 128 and the power manager 114. Additionally, the wedge 128 passes the request (or requests) from the application to the device driver 117, acting a proxy from the driver 117 to receive requests from the application.

Software wedge 128 affords more efficient use of system resources and reduces power consumption because the device driver 117, which utilizes more system resources than the wedge 128, may be unloaded to save resources in favor of the wedge 128 utilizing less system resources. In operation, the wedge 128 may load the device driver 117 transparently (i.e., behind the scenes) without the application knowing that the device driver 117 is not currently loaded and running.

Of further note, the system operating system (OS) 132 may be Microsoft Windows® or any other suitable operating system. The OS 132 is run by the processing circuitry 102 and serves to load and unload the device driver 117 when directed to do so by the system BIOS 122

Figure 2:
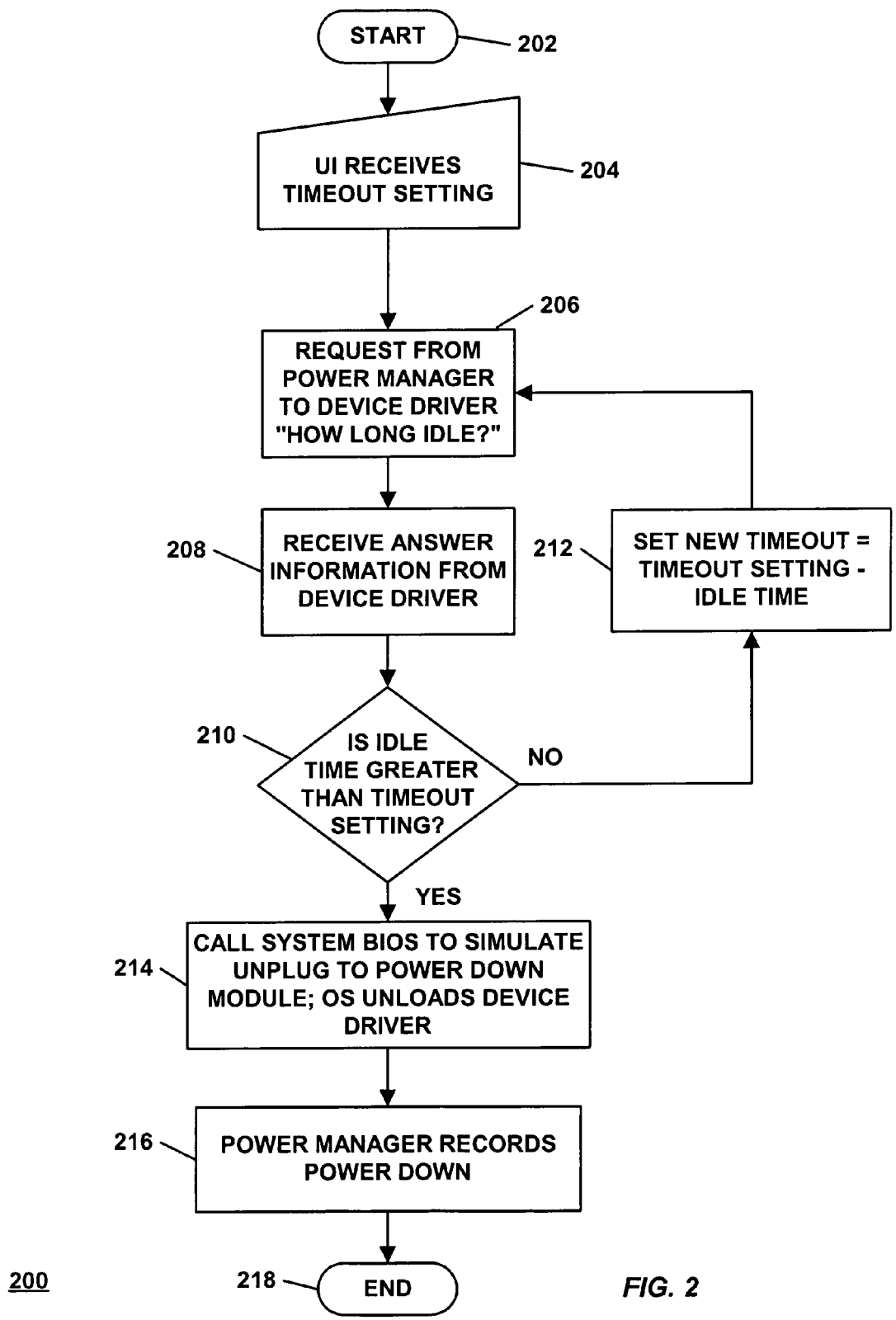
FIG. 2 illustrates a flow diagram of a power down sequence according to an example of the present disclosure.

FIG. 2 illustrates a flow diagram of an example of a power control process that may be effected through the user interface 116 and the power manager 114. Specifically, a process 200 is used to bring about powering down of the module 104 when the module 104 has been idle for a prescribed period of time. As shown in FIG. 2, the procedure 200 initializes at start block 202. The user interface 116 then prompts a user for timeout settings in this example. The timeout settings, such as a maximum allowable idle time, are received through the user interface 116 as illustrated in block 204 and these settings are passed to the power manager 114 via interconnect bus 118. Additionally, it is noted that the power manager 114 may not have initial settings, which are then initially set or entered by the procedure of FIG. 2, or may include preset settings for the various timeout settings, and the procedure of FIG. 2 is used to effect changes in these settings, or any other combination of presets and settings to be entered.

Power manager 114 then issues a query to the device driver 117 via the API 120 asking how long has the plug-in circuit module 104 been idle as indicated at block 206. The device driver 117 then communicates back to the power manager 114 via the API 120 the amount of time the circuit module 104 has been idle as indicated in block 208. The power manager 114 then determines if the idle time is greater than a particular timeout setting (e.g., a maximum allowable idle time) received by the user interface 116 as illustrated in block 210.

If the idle time, as determined at decision block 210, is not greater than the timeout setting, flow proceeds to block 212 where a new timeout setting is established being equal to the previous timeout setting minus the time in which the circuit module 104 has been idle. Flow then returns back to block 206 for another query between the power manager 114 and the device driver 117. The interval at which the query of block 206 is issued may be set to a suitable frequency or, alternatively, may be set to query only after the timeout period has expired. The later option is beneficial for optimizing the system processing resources, thus minimizing the interference with those system processes.

Alternatively at block 210, if the idle time is determined by the power manager 114 to be greater than (or equal than or greater) the timeout setting, communication is sent from the power manager 114 to the system BIOS 122 via the communication link 124 calling the system BIOS to initiate a simulated disconnection of the circuit module 104 in order to cause powering off of the circuit module as illustrated in block 214. As shown also in block 214, the operating system 132 will unload the device driver 117 when the simulated unplugged event occurs. Power manager 114 then records the powering down of the module 104, indicated at block 214 and the process 200 then terminates at block 216.

Figure 3:
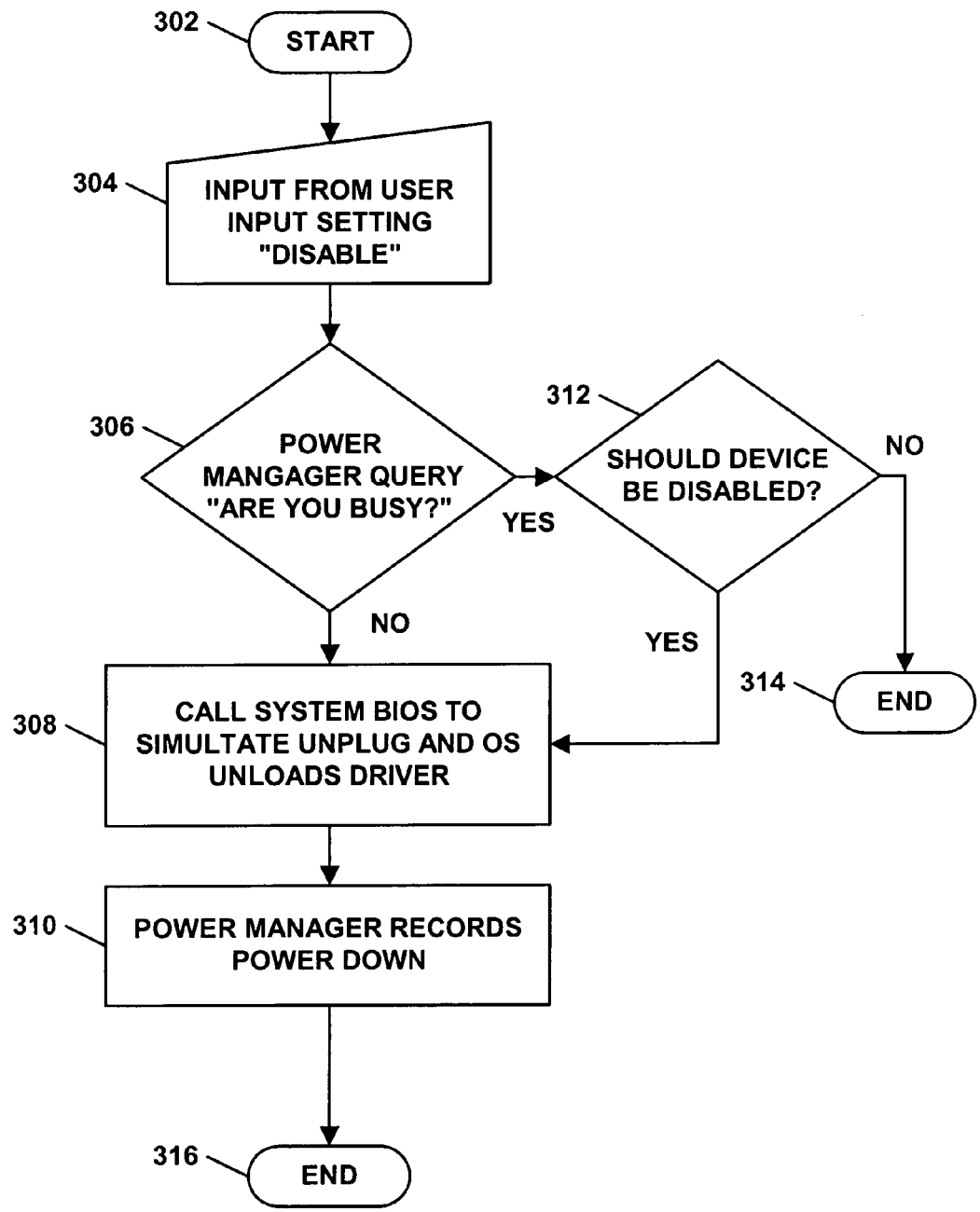
FIG. 3 illustrates a flow diagram of another power down sequence implemented by the system of FIG. 1 according to an example of the present disclosure.

FIG. 3 illustrates a flow diagram of an example of a procedure using the power manager 114 to manually disable or shut down the circuit module 104. As shown, the process 300 is initiated at block 302. A user may initiate an input to "disable" the module 104 as illustrated in block 304. This information is then passed from the user interface 116 to the power manager 114 and the power manager then queries the device driver 117 whether or not the module 104 is currently busy as illustrated in decision block 306. This communication is carried out over the API 120.

If the device driver 117 indicates that the circuit module 104 is not busy, the power manager 115 then calls the system BIOS to simulate an unplug event and the OS 132 unloads the driver as illustrated in block 308. It is noted that this process is the same as discussed previously with respect to block 214 in FIG. 2.

Alternatively at block 306, if the device driver 117 indicates to the power manager 114 that the module 104 is busy, flow proceeds to decision block 312 where the user is prompted via the user interface 116 as to whether or not it is desired that the device 104 be disabled. This prompt is provided since a forced shut down of the module 104 may be detrimental to particular applications currently running. If the user decides that the device should not be disabled, the procedure ends at block 314. Alternatively, rather than prompting a user as indicated at block 312, the process may simply end silently at block 314, thus not allowing a user to manually shut down the module 104 while in use.

Alternatively at block 312, if the user decides that the device should nonetheless be disabled, flow proceeds to block 308 to disable the circuit module 104. The flow then proceeds to block 310 where the power manager 114 records the power down event and the procedure ends at block 316.

Figure 4:
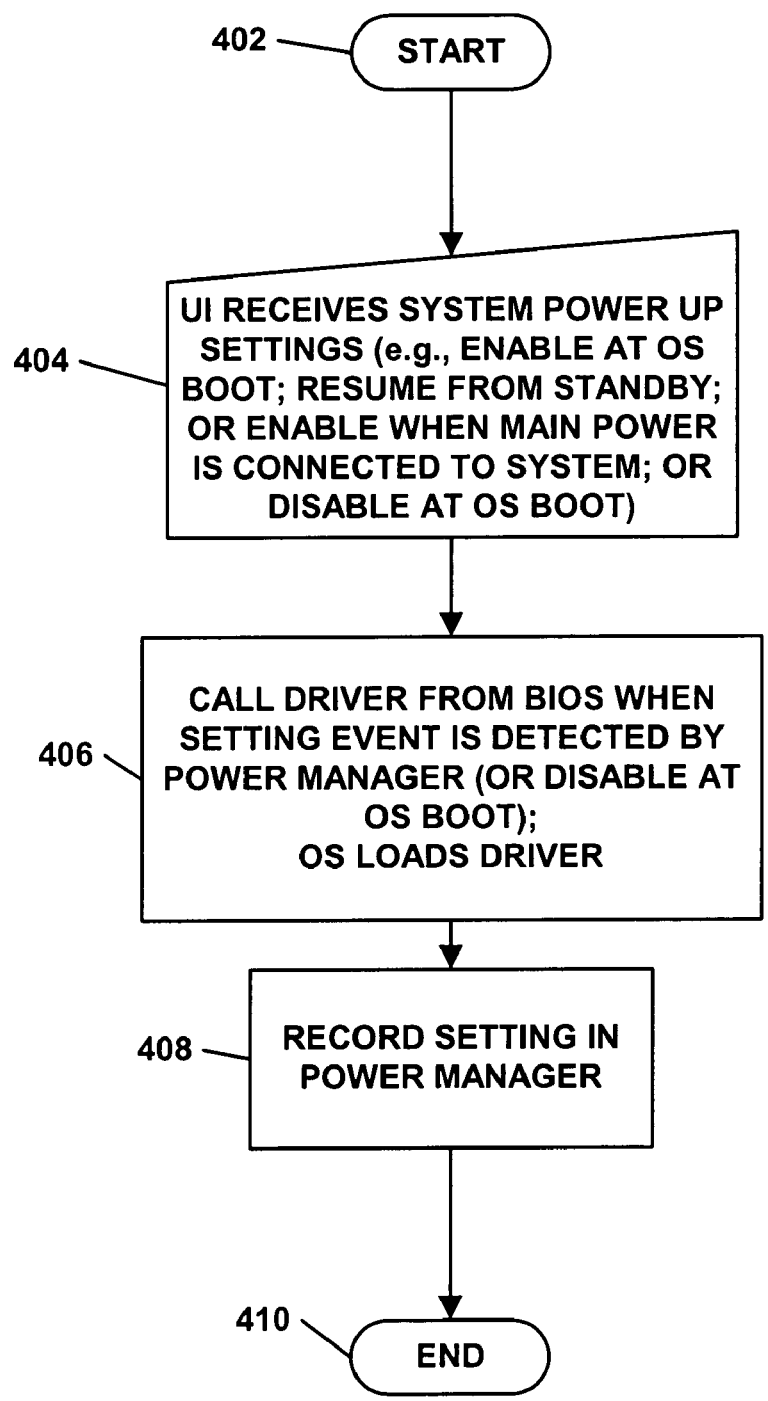
FIG. 4 illustrates a flow diagram of a power up sequence implemented by the system of FIG. 1 according to an example of the present disclosure.

FIG. 4 illustrates a power up process 400 used to power up the module 104 after either being powered down, at a system startup or on resumption from a power standby condition such as hibernation. Additional situations could include a setting enabling powering up of the module 104 when a main power source, such as AC power, for example, is connected to the system. This last option is particularly applicable to situations of laptop computers or mobile computing devices where a change in power sources (e.g., such switching from a main source of power, such as AC power, to an auxiliary source of power, such as a battery) affects the need for power conservation.

As illustrated, process 400 is initiated at block 402. Flow proceeds to block 404 where the user interface 116 prompts and receives system power up settings, which "automatically" are executed dependent on various desired system events. As discussed above, the settings may include, but are not limited to, enabling power up at an operating system startup, such as Windows, powering up from a standby or hibernation, or enabling power up when a main power source is connected to the system.

Flow then proceeds to block 406 where the power manager 114 directs the system BIOS 122 to call the driver 117 and the operating system (OS 132) loads the device driver 117. Additionally, the BIOS 122 initiates powering up of the module 104 via the I/O interface 126. The settings are then recorded by the power manager 114 as illustrated in block 408 in order to save the settings input via the user interface 116. The process then ends as illustrated in block 410. It is noted that once the settings are received by the user interface 116, the process 400 will not need to include the inputs at block 404 but simply proceed to block 406 to determine when any one of the stored power up setting conditions occurs. An example of this process is illustrated in FIG. 5.

Figure 5:
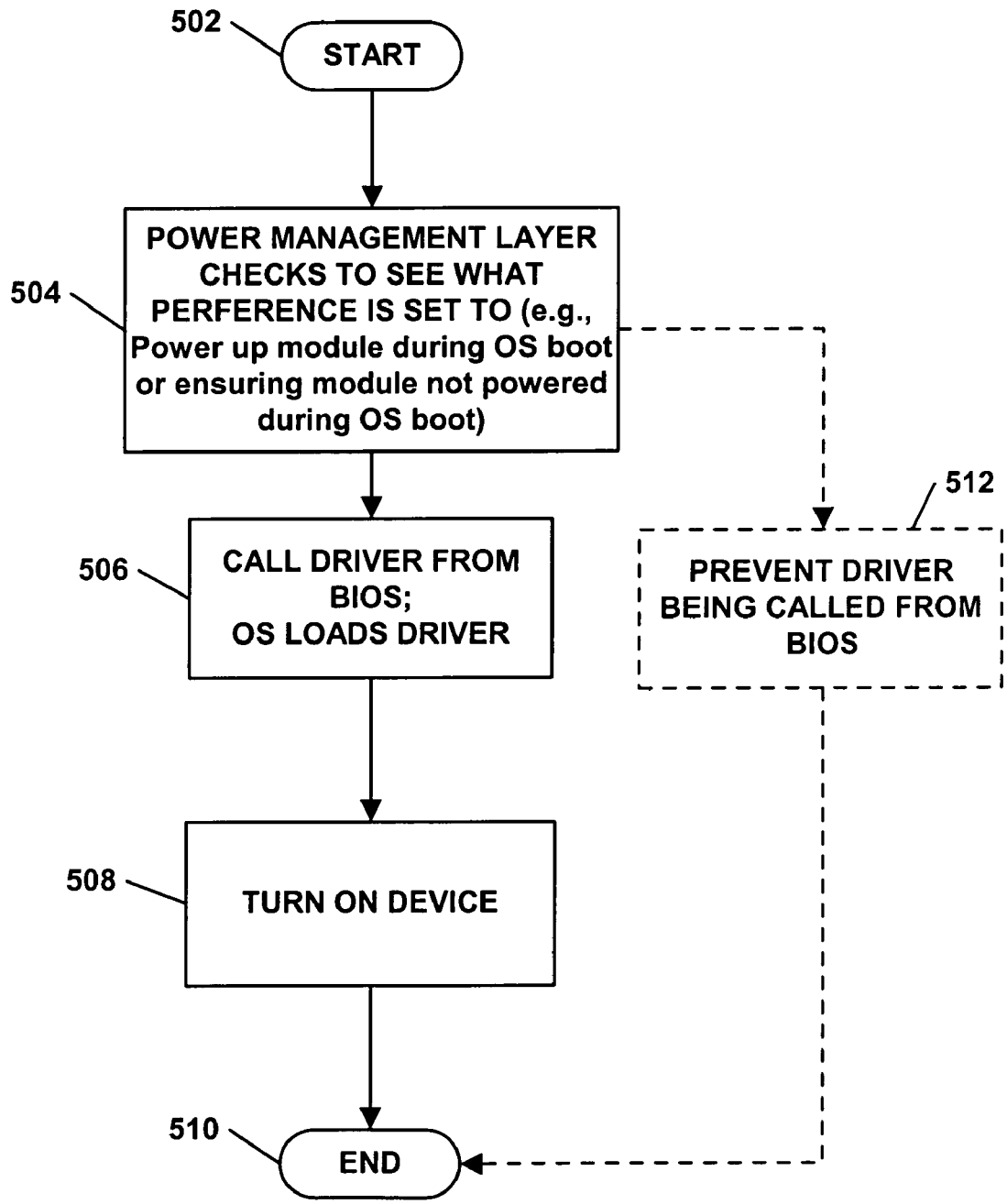
FIG. 5 illustrates a start up flow diagram performed by the system of FIG. 1 according to an example of the present disclosure.

As shown, FIG. 5 illustrates a flow diagram of a procedure initiated primarily by the power manager 114 during power up of the system 100, such as when the system OS 132 is booted. As illustrated, the process 500 initiates at block 502 and flow then proceeds to block 504 where the power manager 114 checks preferences previously set. These settings are any of various settings discussed above, or any other contemplated settings for managing power by control of the power state of the module 104. The driver is then called from the system BIOS 122 and the operating system then loads the device driver 117, such as in the case where the preferences set includes loading the driver at OS 132 boot or startup. The device 104 is then turned on as illustrated in block 508 and the process ends at block 510.

In an alternative of the procedure of FIG. 5, if the preferences checked included disabling the driver at system OS 132 boot or startup, then the driver is prevented from being call by the BIOS 122 (or unload the driver, if already loaded in the boot), as indicated in block 512. The flow would then proceed to block 510, where the procedure ends without the driver being loaded by the OS 132.

Figure 6:
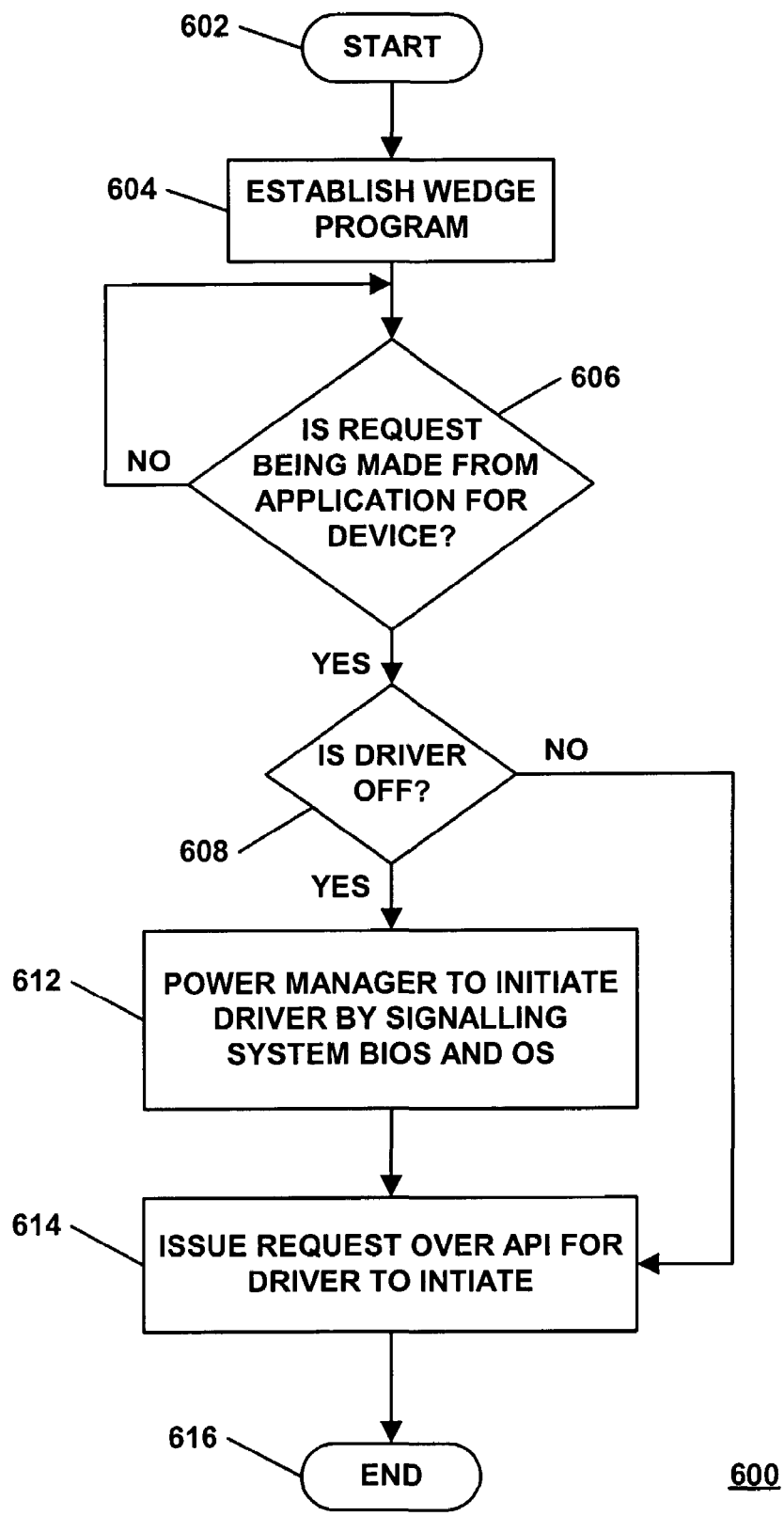
FIG. 6 illustrates a flow diagram of an automated sequence to power on a plug-in circuit module implemented by the system of FIG. 1 in accordance with the example of the present disclosure.

FIG. 6 illustrates a flow diagram of a procedure utilizing the software wedge 128 in order to load the device driver 117 and turn on the circuit module 104 when powered down, but called upon by an application to process data. The procedure 600 starts at block 602 and proceeds to establish a run the wedge program 128 as illustrated in block 604. It is noted that the process in 604 need only be implemented once, such as at system startup. Flow then proceeds to decision block 506 where the software wedge 128 detects whether or not a request is being made from an application for the circuit module 104. The wedge 128 then signals the power manager 114 via the public API 130 of a request. The power manager 114 then determines if the driver 117 is functioning or loaded. If the driver is functional, the process continues to block 614 passing the request to the already functioning driver to be loaded.

Alternatively at block 608, if the driver is not on or loaded, flow proceeds to block 612 where the power manager initiates loading of the driver by signaling the BIOS 122, which in turn signals a plug-in event via the I/O interface as well as causing the operating system OS to load the device driver 117. The power manager 114 then communicates to the device driver 117 over API 120 to initiate as indicated at block 614. The procedure 600 then terminates at block 616.

As described above, the presently disclosed methods and apparatus, by providing various automatic settings using a power manager, provide efficient power management of plug-in devices or modules. In particular, the disclosed methods and apparatus effectively manage power for those plug-in devices that normally are turned on at system startup and stay on, such as TV Tuner cards, for example. Additionally, by providing a software wedge, the power manager can more effectively manage power of a plug-in device, while ensuring that powering down of the plug-in device does not adversely affect applications calling the device.

The above detailed description of the examples has been presented for the purposes of illustration and description only and not by limitation. It is therefore contemplated that the present application cover any additional modifications, variations, or equivalents that fall within the spirit and scope of the basic underlying principles disclosed above and the appended claims.

What is claimed is:

1. A method for controlling power to a circuit module comprising:

controlling the power state of the circuit module, by a power manager, according to one or more power control processes, the circuit module operable in accordance with at least one standard allowing for unplugging of the circuit module from a processing circuitry during an operational connection;

establishing a user interface communicating with the power manager to enable receipt of one or more user data, the user data used to establish settings of the one or more power control processes;

using a device driver configured to operate the circuit module;

establishing a program interface for communication between the power manager and the device driver;

establishing a communication link between the power manager and a system BIOS running on the processing circuitry; and providing an input/output interface between the system BIOS and the circuit module in order to simulate with the system BIOS at least one of disconnection of the circuit module from the system BIOS and connection of the circuit module to the system BIOS.

2. The method as defined in claim 1, wherein the user data includes a maximum allowable idle time setting for the circuit module, and the one or more power control processes includes a timed power down sequence including:

communicating an amount of idle time of the circuit module between the device driver and the power manager;

determining with the power manager whether the amount of idle time is greater than the maximum allowable idle time setting; and calling the system BIOS to initiate a simulated communication disconnection of the circuit module in order to effect powering off of the circuit module when the power manager determines the amount of idle time is greater than the maximum allowable idle time setting.

3. The method as defined in claim 1, wherein the user data includes a setting calling for powering up the circuit module after a system resume from standby, and the one or more power control processes includes a power up sequence including calling the system BIOS to load the device driver.

4. The method as defined in claim 1, wherein the user data includes a setting calling for powering up the circuit module when a system operating system is booted, and the one or more power control processes includes a power up sequence including calling the system BIOS to initiate the device driver.

5. The method as defined in claim 1, wherein the user data includes a setting ensuring the circuit module is not powered when a system operating system is booted, and the one or more power control processes includes calling the system BIOS to prevent loading of the device driver.

6. The method as defined in claim 1, wherein the user data includes a setting calling for powering up the circuit module when the system is connected to a power source, and the one or more power control processes includes a power up sequence including calling the system BIOS to load the device driver.

7. The method as defined in claim 1, wherein the user data includes a setting calling for the powering down the circuit module when the system is disconnected from a main power source and switched to power from an auxiliary power source, and the one or more power control processes includes:

detecting in the power manager using the system BIOS when the main power source is disconnected from the system and power is switched to an auxiliary power source; and calling the system BIOS from the power manager to unload the device driver.

8. The method as defined in claim 1, further comprising:

signaling the power manager, using a wedge, when an application run by a processor is requesting the circuit module when the device driver is unloaded;

issuing a signal from the wedge to the power manager when an application is requesting the circuit module and the device driver is unloaded;

calling the system BIOS with the power manager to load the device driver over the communication link.

9. The method as defined in claim 1, wherein the at least one standard is at least one of PCI Express, USB, and IEEE 1394.

10. A system for controlling a plug-in circuit module comprising:

processing circuitry; and an interface between the processing circuitry and the plug-in circuit module that is configured to allow the plug-in circuit module to connect and communicate with the processing circuitry, where the interface is operable according to an interface standard allowing for unplugging of the plug-in circuit module during an operational connection;

an input/output interface between the processing circuitry and the plug-in circuit module; and memory containing executable instructions such that when processed by the processing circuitry causes the processing circuitry to:

establish a power manager for controlling the power state of the plug in circuit module according to one or more power control processes, the circuit module operable in accordance with at least one standard allowing for unplugging of the circuit module during an operational connection;

establish a user interface communicating with the power manager to enable receipt of one or more user data, the user data used to establish settings of the one or more power control processes;

load a device driver configured to operate the circuit module;

establish a program interface for communication between the power manager and the device driver;

establish a communication link between the power manager and a system BIOS; and simulate using the system BIOS one of a simulated communication connection and a simulated communication disconnection of the circuit module from the system BIOS through the input/output interface.

11. The system as defined in claim 10, wherein the user data includes a maximum allowable idle time setting for the circuit module, and the one or more power control processes includes a timed power down sequence wherein the processing circuitry also is caused to:

communicate an amount of idle time of the circuit module between the device driver and the power manager;

determine with the power manager whether the amount of idle time is greater than the maximum allowable idle time setting; and call the system BIOS with the power manager to initiate a simulated communication disconnection of the circuit module in order to effect powering off of the circuit module when the power manager determines the amount of idle time is greater than the maximum allowable idle time setting.

12. The system as defined in claim 10, wherein the user data includes a setting calling for powering up the circuit module after a system resume from standby, and the one or more power control processes includes a power up sequence including calling the system BIOS to with the power manager to load the device driver.

13. The system as defined in claim 10, wherein the user data includes a setting calling for powering up the circuit module when a system operating system is booted, and the one or more power control processes includes a power up sequence including calling the system BIOS with the power manager to initiate the device driver.

14. The system as defined in claim 10, wherein the user data includes a setting ensuring the circuit module is not powered when a system operating system is booted, and the one or more power control processes includes calling the system BIOS with the power manager to prevent loading of the device driver.

15. The system as defined in claim 10, wherein the user data includes a setting calling for powering up the circuit module when the system is connected to a main power source, and the one or more power control processes includes a power up sequence including calling the system BIOS with the power manager to load the device driver.

16. The system as defined in claim 10, wherein the user data includes a setting calling for the powering down the circuit module when the system is disconnected from a main power source and switched to power from an auxiliary power source, and the one or more power control processes includes a sequence wherein the processing circuitry also is caused to:
   detect in the power manager using the system BIOS when the main power source is disconnected from the system and power is switched to an auxiliary power source; and
   call the system BIOS from the power manager to unload the device driver.

17. The system as defined in claim 10, wherein the processing circuitry also is caused to:
   signal the power manager, using a wedge, when an application run by the processing circuitry is requesting the circuit module when the device driver is unloaded;
   issue a signal from the wedge to the power manager when an application is requesting the circuit module and the device driver is unloaded;
   call the system BIOS with the power manager to load the device driver over the communication link.

18. The system as defined in claim 10, wherein the at least one standard is at least one of PCI Express, USB, and IEEE 1394.

19. A storage medium comprising:
   memory containing executable instructions such that when processed by one or more processors causes at least one processor to:
      control the power state of the circuit module, by a power manager, according to one or more power control processes, the circuit module operable in accordance with at least one standard allowing for unplugging of the circuit module during an operational connection;
      establish a user interface communicating with the power manager to enable receipt of one or more user data, the user data used to establish settings of the one or more power control processes;
      load a device driver configured to operate the circuit module;
      establish a program interface for communication between the power manager and the device driver;
      establish a communication link between the power manager and a system BIOS; and
      issue at least one signal over an input/output interface between the system BIOS and the circuit module in order to simulate with the system BIOS at least one of communication disconnection of the circuit module from the system BIOS and connection of the circuit module to the system BIOS.

20. The storage medium as defined in claim 19, wherein the user data includes a maximum allowable idle time setting for the circuit module, and the one or more power control processes includes a timed power down sequence wherein the at least one processor also is caused to:
   communicate an amount of idle time of the circuit module between the device driver and the power manager;
   determine with the power manager whether the amount of idle time is greater than the maximum allowable idle time setting; and
   call the system BIOS with the power manager to initiate a simulated communication disconnection of the circuit module in order to effect powering off of the circuit module when the power manager determines the amount of idle time is greater than the maximum allowable idle time setting.

21. The storage medium as defined in claim 19, wherein the user data includes a setting calling for powering up the circuit module after a system resume from standby, and the one or more power control processes includes a power up sequence including calling the system BIOS with the power manager to load the device driver.

22. The storage medium as defined in claim 19, wherein the user data includes a setting calling for powering up the circuit module when a system operating system is booted, and the one or more power control processes includes a power up sequence including calling the system BIOS with the power manager to initiate the device driver.

23. The storage medium as defined in claim 19, wherein the user data includes a setting ensuring circuit module is not powered when a system operating system is booted, and the one or more power control processes includes calling the system BIOS with the power manager to prevent loading of the device driver.

24. The storage medium as defined in claim 19, wherein the user data includes a setting calling for powering up the circuit module when the system is connected to a main power source, and the one or more power control processes includes a power up sequence including calling the system BIOS with the power manager to load the device driver.

25. The storage medium as defined in claim 19, wherein the user data includes a setting calling for the powering down the circuit module when the system is disconnected from a main power source and switched to power from an auxiliary power source, and the one or more power control processes includes a sequence wherein the at least one processor also is caused to:
   detect in the power manager using the system BIOS when the main power source is disconnected from the system and power is switched to an auxiliary power source; and
   call the system BIOS from the power manager to unload the device driver.

26. The storage medium as defined in claim 19, wherein the at least one processor also is caused to:
   signal the power manager, using a wedge, when an application run by the at least one processor is requesting the circuit module when the device driver is unloaded;
   issue a signal from the wedge to the power manager when an application is requesting the circuit module and the device driver is unloaded;
   call the system BIOS with the power manager to load the device driver over the communication link.

27. The storage medium as defined in claim 19, wherein the at least one standard is at least one of PCI Express, USB, and IEEE 1394.

* * * * *

UNITED STATES PATENT AND TRADEMARK OFFICE
CERTIFICATE OF CORRECTION

| | | |
|---|---|---|
| PATENT NO. | : 7,657,762 B2 | Page 1 of 1 |
| APPLICATION NO. | : 11/036254 | |
| DATED | : February 2, 2010 | |
| INVENTOR(S) | : Stephen J. Orr | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1405 days.

Signed and Sealed this
First Day of March, 2011

David J. Kappos
*Director of the United States Patent and Trademark Office*